Dec. 2, 1952      C. W. BERTHIEZ      2,620,238
OIL RECOVERY DEVICE FOR MACHINE SLIDEWAYS
Filed July 27, 1948      2 SHEETS—SHEET 1
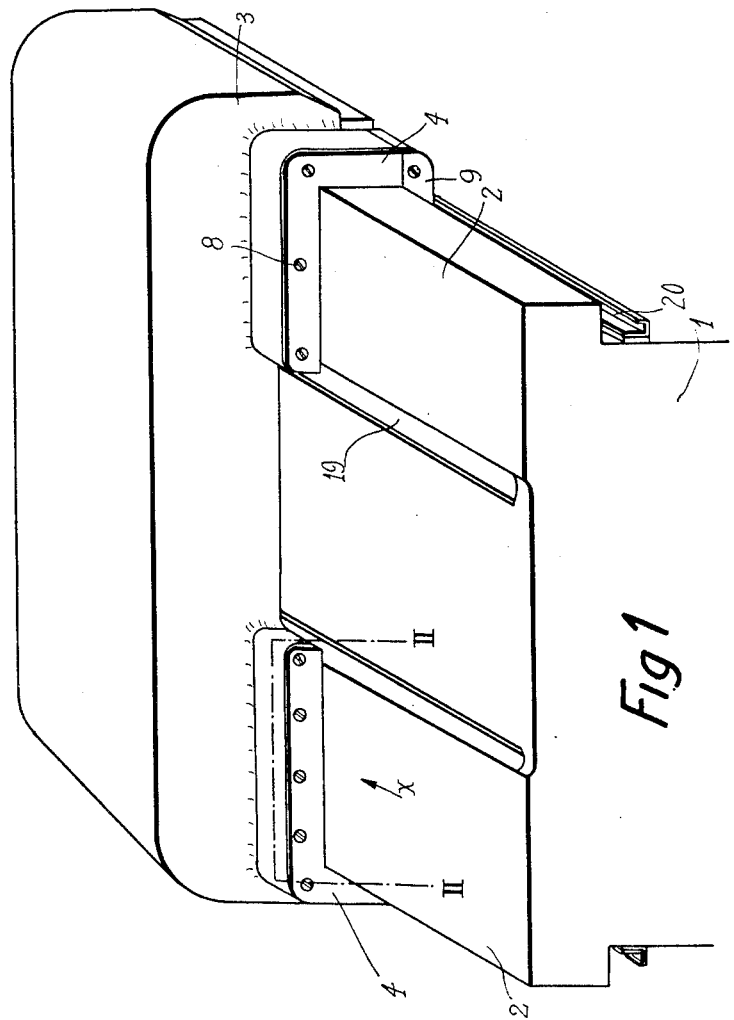
INVENTOR
Charles William Berthiez
By Corey & Jacobs
ATTORNEYS Dec. 2, 1952            C. W. BERTHIEZ            2,620,238
OIL RECOVERY DEVICE FOR MACHINE SLIDEWAYS
Filed July 27, 1948            2 SHEETS—SHEET 2
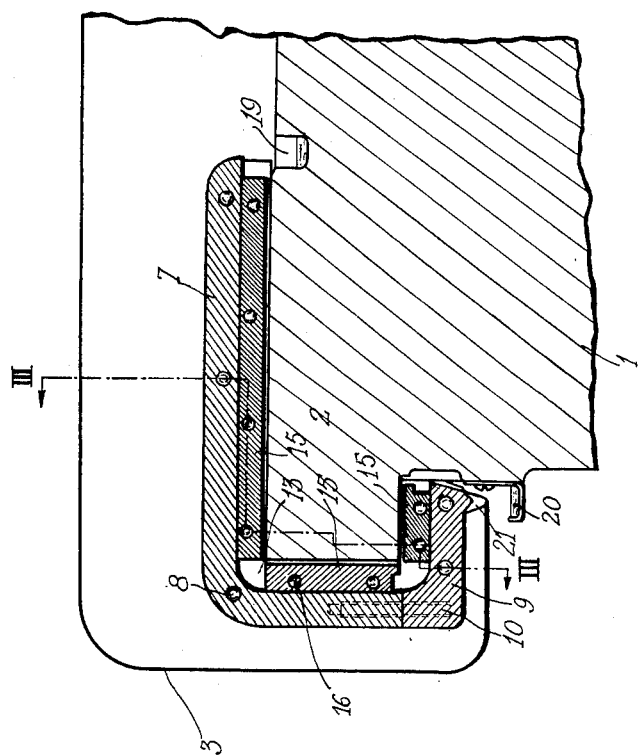
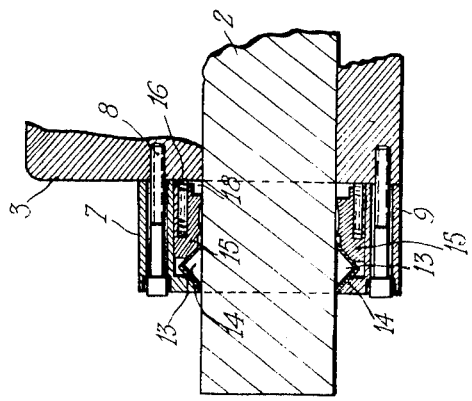
INVENTOR
Charles William Berthiez
By Corey & Jacobi
ATTORNEYS Patented Dec. 2, 1952

2,620,238

UNITED STATES PATENT OFFICE 2,620,238

OIL RECOVERY DEVICE FOR MACHINE SLIDEWAYS

Charles William Berthiez, Paris, France

Application July 27, 1948, Serial No. 40,827
In France August 29, 1947

8 Claims. (Cl. 308—3.5)

It is well known that the slideways of machines, such as machine tools, require adequate lubrication in order to be maintained in good running order. In large machines, and particularly in large machine-tools, this lubrication is mostly accomplished with oil under pressure to insure the formation of an oil film between the two sliding or contacting surfaces.

Such a system requires the presenec of an oil retaining device cooperating with the slideways in order to prevent the oil from escaping from between the two sliding surfaces and spreading upon the free portions of the slideways. In fact, such escape of oil may have serious consequences because the oil spread upon the slideways can retain thereon undesirable foreign substances, such as chips, swarf or dust caused by the machining or otherwise accumulated, which are prejudicial to the keeping of the slideways in good working condition. Moreover, careful filtering of the oil would be then necessary in recovering it and this would result in an appreciable loss of oil.

The oil retaining devices commonly used are composed of scrapers but their effectiveness is rather limited due particularly to the fact that they wear out rapidly owing to the friction occurring between the scrapers and the slideways.

The arrangement according to the present invention, in contrast, secures a completely satisfactory wiping of the portions of the slideways of one of the relatively movable members of the machine that alternately become covered and uncovered by the other relatively movable member. Thus, the slideways are constantly kept in clean condition and chips, swarf or other detrimental substances are not retained by excess oil left on the slideways. Furthermore, as the oil is constantly kept within and covered by the machine parts, it cannot pick up these foreign materials and may be easily collected without requiring any special pre-treatment before being reused.

The device for recovering the lubricating oil from machine slideways according to the invention comprises a scraper mounted at an end of a given one of the two relatively moving slideway members, that is, the one which during the operation of the machine has its slideway surface always covered by the other slideway member. This scraper has at least one surface which is adjacent and is sloped with respect to the slideway surface of the other slideway member, one edge of the scraper along this sloped surface engaging the slideway surface of this other member. A pushing element is disposed with one end bearing upon this sloped surface of the scraper while the other end of this pushing element bears against the given slideway member so that the scraper slides with the given member relative to the slideway surface of the other member, means being provided resiliently to urge the pushing element against the sloping surface of the scraper so as to effect movement of the edge of the scraper transversely of the slideway surface of this other member into contact therewith.

Preferably, the scraper provides a plurality of similarly constructed and functioning scraper elements cooperating respectively with the plurality of slideway surfaces conventionally provided on a slideway member of the machine so that the entire peripheral extent of the cross-section of this slideway member, that extends along and is in the plane transverse to the contacting surfaces of the slideway members, has scraper elements carried by the given slideway member and moving in contact with the slideway surfaces of the other member.

According to another feature of the invention, the scraper is housed in a detachable part secured at the end of the given slideway member the surfaces of which always are covered by the other slideway member in the operation of the machine.

According to a further feature of the present invention, each scraper preferably is formed with a second sloped surface inclined oppositely to the first sloped surface above referred to with respect to the slideway surface of the other slideway member with which the scraper is in contact. The scraper along this second surface has an edge cooperating with this slideway surface of the other member similarly to the first edge of the scraper but acting in the opposite direction with respect to the relative movement of the two slideway members of the machine because of the opposite slope of the second surface. This second sloped surface of the scraper is adapted to bear against a portion of the given member, the slideway surface of which is always covered by the other member, so that under the thrust of the pushing element, above referred to, the scraper is urged transversely off and into contact with the slideway surface of this other member.

Preferably also, each of the scrapers which respectively bear on the plurality of surfaces of the other slideway member is made of an angle member disposed with the lengthwise edges of both of the flanges or legs thereof bearing on the slideway surface of the other slideway member, the angle members being disposed so that these edges of the flanges thereof extend along the slideway surface transversely of the direction of the relative movement of the two slideway members.

According to another characteristic of the invention, a relief or depression chamber for the oil forced out under pressure from between the slideway surfaces is provided adjacent to the part of the scraper disposed towards the given slideway member, so that oil arriving at the scraper will be kept substantially at atmospheric pressure. This depression chamber communicates with an oil collective device.

Other characteristic features of the invention will become apparent from the following description and the accompanying drawings given by way of example only and wherein:

Fig. 1 is a diagrammatic perspective view showing the external aspect of a device according to the invention for recovering the oil which lubricates the slideways of a machine having a carriage moving on a bed.

Fig. 2 is a cross-section on line II—II of Fig. 1, and

Fig. 3 is a cross-section on line III—III of Fig. 2.

Referring now to the drawings, these illustrate a bed 1 provided with a pair of slideway surfaces 2 on which a carriage 3 is adapted to slide. Reference numeral 4 indicates in Fig. 1 the assembly of parts employed for recovering the oil used for lubricating the slideways. The two devices 4 are symmetrical, whereby the description of a single device will give a sufficient disclosure of the invention.

Referring now more in detail to Figs. 2 and 3, it will be seen that they also illustrate one of the slideways 2, the carriage 3 and the oil recovering device cooperating therewith. This device consists essentially of a housing 7 secured to the end of the carriage 3 by means of screws 8 which may be also seen in Fig. 1.

On this member 7 is secured a flange 9 by means of screws 10. The member 7 and the flange 9 provide a recess 13 wherein angle members 14 may be positioned so as to apply their flange or leg edges on the slideway surface 2, these angle members being arranged so that these edges thereof extend transversely of the direction of movement of the carriage.

The angle members are disposed with one of their sloping faces positioned at the left-hand side of the drawing, Fig. 3, bearing against the similarly inclined wall of the member 7 or of flange 9.

Within the recess 13 of the member 7 and flange 9 are also provided push elements or blocks 15 having also an inclined surface adapted to contact the other face of the angle members 14. Compression springs 16 are disposed in holes drilled in the blocks 15 and have one end bearing against the end of the carriage 3 to urge at their other ends the push elements or blocks 15 towards the left, as seen in Fig. 3, whereby they push the angle members against the inclined inner surface of the member 7 and flange 9, so that due to the slope of the inclined contacting surfaces the angle members are also urged toward the slideway surfaces 2 with their edges in contact with these surfaces.

Further, the push elements 15 are provided with recesses 18 adapted to form a depression or relief chamber for the oil which, under pressure between the surfaces, leaks from between the two surfaces of the slideway members. This relief chamber 18 is similar to the chamber referred to as "depression chamber" in the co-pending U. S. patent application Serial No. 587,774, filed April 11, 1945, now Patent No. 2,539,769, issued January 30, 1951, for "Oil Recuperator for Machine Slideways." The chamber 18 serves to carry the oil collected therein upon the upper surfaces of the slideway member to a gutter 19 (Fig. 2) and at the lower surfaces to a gutter 20. To prevent any oil which may leak from the depression chamber between the flange 9 and the bed 1 from passing along this flange and thus flowing outside the gutter 20, a drip element or eave 21 is provided on the flange 9 just above the gutter 20, see Fig. 2, from which the oil may drip into gutter 20.

The operation of the oil recovery device as described hereinabove is self-explanatory. When the machine is operating, oil is forced under pressure between the sliding surface of the carriage 3 and the slideway surface 2 of the bed where it forms an oil film necessary for suitably lubricating the machine. The oil under pressure leaking from between the contacting surfaces over the longitudinal edges thereof falls directly into the gutter 19 or into the gutter 20 from which it is led towards a collecting device. The oil which tends to escape from the ends of the carriage 3 may be immediately collected in the depression or relief chamber 18 from the slideway surfaces 2 in the forward movement of the carriage and may be scraped toward the depression chamber by the angle scrapers 14 in the return movement of the carriage. The oil collected in the chamber 18 may escape laterally therealong until it reaches and is collected in the gutters 19 or 20.

In this manner lubrication with oil under pressure may be correctly insured while constantly keeping the slideways in a very clean condition because the areas which become uncovered as the members are moved in the operation of the machine will not have any oil exposed thereon externally of the contacting surfaces. Moreover, the edge of the scraper directed outwards from the carriage 3 prevents the penetration of chips or dust or other materials between the slideway surface of the carriage and the supporting slideway surface 2 of the bed.

It will be remarked that, due to the sloping faces of the scraper 14 and the pressure exerted by the pushing blocks 15 on one of these faces and the pressure of the scraper at its other sloping surface on the internal sloping surface of the housing 7, the scraper will be held constantly in effective contact with the slideway surface 2 whatever the amount of wear on the edges of the scraper itself may be.

Of course, the invention is not restricted to the embodiment described and illlustrated which is given merely as an example. Thus, the depression chamber may be dispensed with by retaining only the scraper action per se.

The recess for housing the scrapers and their pushing blocks, instead of being formed in the housing 7 and flange 9 detachably mounted on the carriage 3, may be machined from or otherwise provided directly in the carriage 3 adjacent to the end thereof.

The above description refers to a particular embodiment as shown in the drawings wherein the device according to the invention is applied to slideway members of rectangular cross-section but it will be apparent to those skilled in the art that a device having the same characteristics may be applied to slideway members of any other cross-section, such as trapezoidal, triangular, etc.

What I claim is:

1. A device for retaining the oil which lubricates the sliding faces of two members of a machine slidably movable relative to each other, comprising means providing a chamber at an end of the one of said members which is never uncovered by the other when the machine is operating, a scraper arranged in said chamber and constituted by a rigid piece formed of two wings angularly disposed relative to each other and joined along a common edge at a distance from said sliding face of the other member of the machine sufficient to provide free edges of the respective wings, said free edges of said wings being adapted to be in sliding engagement with said sliding face of said other member, and means biasing said scraper for continuously maintaining said free edges of said wings in said sliding engagement.

2. A device such as claimed in claim 1, wherein the outer face of a given one of said wings is adapted to be in engagement with a slanting face of a part provided by said means providing said chamber, the outer face of the other of said wings being adapted to be in engagement with said biasing means.

3. A device such as claimed in claim 2, wherein said biasing means comprises a push element also arranged in said chamber and provided with a slanting face, and resilient means for urging said given wing against said slanting face of said part and for urging said slanting face of said push element against said other wing of said scraper.

4. A device such as claimed in claim 2, wherein said biasing means comprises a push element also arranged in said chamber and provided with a slanting face, and spring means provided between said push element and the inner wall of said chamber opposite said part provided with said slanting face.

5. A device such as claimed in claim 1, wherein said chamber is formed in a detachable piece secured to said member never uncovered when the machine is operating.

6. A device such as claimed in claim 1, wherein said chamber is a depression chamber where the oil squirting from between the sliding faces of said members is collected at atmospheric pressure, and means providing passages for leading the oil to a place of disposal and communicating with said chamber in all positions of said sliding movement of said members to receive the oil from said chamber.

7. A device for receiving the oil which lubricates and passes out from between the faces of two members of a machine movable relative to each other with said faces thereof in sliding contact with each other, a given one of said members which is never uncovered by the other in the operation of the machine being formed with an end face transverse to the direction of relative movement of said members, which comprises means providing a chamber adjacent said face of said given member, a scraper arranged in said chamber so as to be movable therein relative to said means providing said chamber in the direction parallel to the direction of the relative movement of said members, said scraper being provided with two legs each having generally parallel surfaces sloped in one leg relative to the other oppositely in said direction of relative movement, said scraper being disposed with the edges of said legs which are at the greater distance apart in said direction in contact with the sliding surface of said other member, and means cooperating with said means providing said chamber for biasing said scraper to maintain the edges of said legs thereof which are in contact with the sliding face of said other member continuously in engagement therewith.

8. A device for receiving the oil which lubricates and passes out from between the faces of two members of a machine movable relative to each other with said faces in sliding contact with each other, a given one of said members which is never uncovered by the other in the operation of the machine being formed with an end face transverse to the direction of relative movement of said members, which comprises walls disposed so as to cooperate with said given member and the sliding face of said other member to enclose a chamber adjacent said face of said given member and movable therewith, one of said walls being disposed opposite to said face of said given member and providing a part having a surface sloping with respect to the direction of relative movement of said members, a scraper arranged in said chamber so as to be movable therein relative to said walls thereof generally parallel to said direction of relative movement and provided with two legs respectively having surfaces sloped in one leg relative to the other oppositely with respect to said direction of relative movement, the edges of said legs which are at the greater distance apart being in contact with the sliding surface of said other member, a push element arranged within said chamber for movement in the direction parallel to the relative movement of said members and providing a surface sloping with respect to said direction of relative movement of said members, said part and said push element being disposed in relation to said scraper with the sloping surface of said part and the sloping surface of said push element respectively in contact with the sloping surfaces of said scraper, and bias means cooperating with said push element and said face of said given member to bias said push element in contact with said scraper and said scraper in contact with said part to maintain said edges of the legs of said scraper in engagement with the sliding surface of said other member.

CHARLES WILLIAM BERTHIEZ.

REFERENCES CITED

The following references are of record in the file of this patent:

UNITED STATES PATENTS

| Number | Name | Date |
|---|---|---|
| 570,726 | Butts | Nov. 3, 1896 |
| 680,345 | Morrison | Aug. 13, 1901 |
| 828,554 | Kilborn et al. | Aug. 14, 1906 |
| 1,656,880 | Mason | Jan. 17, 1928 |
| 1,938,786 | Vancil | Dec. 12, 1933 |
| 1,991,177 | Rutz et al. | Feb. 12, 1935 |